United States Patent Office 2,934,932
Patented May 3, 1960

2,934,932

HYDRAULIC CEMENT MORTAR COMPOSITIONS AND METHODS OF USE

Herman B. Wagner, Perkasie, Pa., assignor to Tile Council of America, Incorporated, a corporation of New York No Drawing. Application September 30, 1957
Serial No. 686,848

10 Claims. (Cl. 72—18)

This invention relates to improved hydraulic cement mortar compositions and, more particularly, to improved mortars especially suitable for grouting and setting tile, laying masonry, stuccoing and plastering. The invention also relates to methods of using these mortars and to methods of preparing them.

Conventional mortars for setting tile and laying up masonry consist of Portland cement, lime and sand. Water is added to this mixture to obtain workability and to take part in the hardening or curing action by means of which the cement forms a gel. These mortars are not entirely self-curing in that they tend to lose considerable water by evaporation into the surrounding air and also by absorption into the tile or masonry which is being set. If the water loss is too great, the curing action is incomplete and the mortar becomes soft and chalky.

Conventional Portland cement mortars and setting beds for ceramic tile offer certain other disadvantages as well as certain positive features. Advantages include high bond strengths obtained when properly installed, non-flammability, permanence, high water-resistance, and immunity to rodent, insect, and fungi attack. On the negative side conventional Portland cement mortars require heavy, thick, and generally multiple layers to be placed before setting the tile. This entails the use of large quantities of these materials and requires considerable labor for the mixing, placement, and trowelling of such under layments. There is the disadvantage also that very wet conditions must be maintained for proper hardening and bonding of conventional Portland cement composition; this has necessitated the troublesome operations of soaking all non-vitreous ceramic tile before setting and has required considerable precautions to be taken to provide thoroughly wet conditions on the substrate over which the mortar is placed and in the atmosphere surrounding the tiled area during the period of curing. Furthermore, because of the necessity for maintaining such very wet conditions and also because of the great bulk of the materials associated with a conventional Portland cement-ceramic tile installation, it has been often impossible or impractical to use such mortars over such substrates as gypsum wallboard or plaster. Another disadvantage of conventional mortars is that, although under optimum conditions, they can form strong bonds to masonry, tile and other surfaces, optimum conditions are seldom present, and, under conditions prevalent in the usual installation, bonding is poor. Slight movements, for example, such as those inherent in the shrinkage that occurs during curing, or vibrations caused by external disturbances, can completely destroy the bond.

One object of the present invention is to provide an improved mortar for the uses above-mentioned as well as for other uses which will be described hereinafter.

Another object of the invention is to provide an improved mortar which is substantially self-curing.

Another object of the invention is to provide an improved mortar which forms strong bonds to masonry, tile, wall board and many other types of surfaces under widely varying conditions of installation.

A further object of the invention is to provide improved methods of setting ceramic tile.

Another object of the invention is to provide an improved mortar composition which is dry-setting, that is, which does not lose substantial amounts of water to its surroundings during the curing stages.

Another object of the invention is to provide an improved method of preparing Portland cement mortars at the job site.

A still further object of the invention is to provide an improved Portland cement mortar which is thin-setting, that is, can be used in setting beds which are relatively much thinner than those required with conventional hydraulic cement mortars.

I have invented Portland cement compositions and installation techniques that retain the advantages cited above, while avoiding the disadvantages ordinarily associated with the usual Portland cement mortars. I have found that the incorporation of methyl cellulose and of certain other ingredients, along with Portland cement, in certain relative proportions, and the use of such compositions according to certain techniques hereinafter described, makes possible the following new and useful installation methods, and provides the following advantages:

(1) Thin layers of mortar can be effectively employed in place of the conventional heavy mortar layers. In many instances only a single thin layer of less than 1/8" thickness can be used.

(2) No wetting of the tile is required before setting, nor any wetting of the substrate before placement of the mortar layer.

(3) The compositions and techniques allow of use over such water-sensitive or less firm substrates as gypsum wallboard or plaster where hitherto Portland cement compositions could not be employed.

(4) A considerable savings in material and labor is effected.

(5) At the same time the customary non-flammability, strength, and durability of conventional Portland cement mortars are retained.

A number of problems have been overcome in developing such compositions and techniques and in developing a system exhibiting the unique and quite remarkable properties discovered. Means are required for preventing the loss of water from the mortar composition to either the dry backing or to the absorptive back of a dry tile pressed into contact with the mortar setting bed. This water-retentive property is obtained by causing the viscosity of the liquid phase obtained upon water addition to the compositions to be sufficiently high so that no egress of the water to tile or substrate will occur or so that the rate of such water loss is greatly diminished. This effect of increased viscosity may be accomplished by adding to water any sufficiently water-soluble polymeric substance. For the purpose of providing to the water phase such increased viscosity, and at the same time allowing of effective concomitant use with Portland cement, not all such water-soluble polymeric substances may be used. Certain polymeric additives such as the polyelectrolyte type, while providing increased viscosity in pure water, produce flocculation of the Portland cement and are themselves precipitated. Other additives permanently prevent hardening of the Portland cement, and are thus unsuitable.

I have found that given viscosity types of methyl cellulose, used in appropriate proportions to Portland cement and water, yield compositions that have the required water phase viscosity characteristics, do not flocculate the Portland cement, are not precipitated by constituents of the Portland cement, and do not prevent hardening of the Portland cement. I have found that, in order to obtain the degree of water-retentivity required for this purpose, a minimum water-phase viscosity in the mortars of about 500 centipoises must be obtained and I have developed compositions of methyl cellulose, Portland cement, water, and other ingredients which meet these requirements and I have used, along with certain application techniques, to set ceramic tile.

A particular feature of the invention is the development of improved compositions including ingredients as sand, limestone and the like and also the determination of the proper variations in composition that should be made in practical use to provide for workable mortars where only a relatively short slaking time can be allowed or where mixing and dispersion is of a degree common or practicable in actual field use.

A further feature of the invention is the development of new techniques, impossible or previously unknown in the ceramic tile industry, but now made possible because of the new compositions. These techniques are:

(1) Use of a mortar layer of less than 1/8" thickness.
(2) Use over a dry substrate without prior wetting.
(3) Setting of dry, non-vitreous tile on such a mortar without water soaking.
(4) Use of a thin layer of such compositions spread on the back of a dry tile as a "dope coat."
(5) Use of a thin layer of such a mortar over a conventional mortar as a "skimcoat" to which a non-vitreous tile will subsequently adhere.
(6) Use of such compositions for setting paper mounted vitreous or non-vitreous tile whereby such compositions are spread on the tile sheet to be then placed without rupture of the paper to tile bond.

Typical examples of compositions containing sand or limestone, within the scope of the present invention will now be given, together with explanations of typical uses.

*Example 1*

A mixture made up of:

81.12% Portland cement
18.10% powdered limestone
0.78% methyl cellulose (400 centipoise viscosity in 2% solution)

was stirred into 33% of its weight of water to prepare a mortar that could be trowelled over dry gypsum wallboard, cinder or cement block, cement asbestos board, or plaster to form a 1/16" to 1/8" thick, smooth, adhered layer of mortar that did not lose appreciable water to the backing. Dry, porous, nonvitreous tile could be set, without prior water soaking, over this mortar layer. After several days time allowed for curing, a hard mortar layer was obtained which showed strong bonding to both the tile and the backing. Since the mortar layer needed was only about one-quarter the thickness and weight of the layer that would have been required if conventional mortar without methyl cellulose had been used, the dead weight of the installation was greatly reduced and the cost and labor of installation also considerably lessened. The dry-setting properties of the mortar also introduced many other advantages since the tile and the backing surface did not have to be soaked with water prior to installation and the environment did not need to be kept damp during the curing period.

*Example 2*

A mixture made up of:

81.12% Portland cement
18.45% powdered limestone
0.43% methyl cellulose (4000 centipoise grade)

was stirred into 33% of its weight of water to give a mortar similar in its desirable properties to that of Example 1.

*Example 3*

A mixture of:

41.0% Portland cement
59.6% fine dry sand
9.0% powdered limestone
0.39% methyl celulose (400 centipoise grade)

was stirred into 22% of its weight of water. This provided a more economical mixture which had properties nearly comparable to those of Example 1 and 2.

*Example 4*

89.22% Portland cement
10.00% powdered limestone
0.78% methyl cellulose (400 centipoise grade)

stirred into 35% of its weight of water.

*Example 5*

89.04% Portland cement
10.00% powdered limestone
0.60% methyl cellulose (400 centipoise grade)

stirred into 35% of its weight of water.

*Example 6*

54.22% Portland cement
45.00% powdered limestone
0.78% methyl cellulose (400 centipoise grade)

stirred into 35% of its weight of water.

*Example 7*

89.57% Portland cement
10.00% powdered limestone
0.43% methyl cellulose (4,000 centipoise grade)

stirred into 33% of its weight of water.

*Example 8*

54.57% Portland cement
45.00% powdered limestone
0.43% methyl cellulose (4,000 centipoise grade)

stirred into 33% of its weight of water.

*Example 9*

26.00% Portland cement
73.61% sand
0.39% methyl cellulose (400 centipoise grade)

stirred into 20% of its weight of water.

*Example 10*

83.50% Portland cement
10.00% powdered limestone
6.50% methyl cellulose (10 centipoise grade)

stirred into 35% of its weight of water.

*Example 11*

79.75% Portland cement
20.00% powdered limestone
0.25% methyl cellulose (7,000 centipoise grade)

stirred into 35% of its weight of water.

*Example 12*

89.70% Portland cement
10.00% sand
0.30% methyl cellulose (7,000 centipoise grade)

stirred into 33% of its weight of water.

*Example 13*

86.50% Portland cement
10.00% sand
3.50% methyl cellulose (10 centipoise grade)

stirred into 33% of its weight of water.

Example 14

The following mixture:

49.67% Portland cement
49.67% sand
0.66% 400 centipoise methyl cellulose was mixed into 27% of its weight of water. This provided a thin-setting mortar that was applied over dry cinder block in a ¼ inch thick layer, upon which was set dry 4¼ inch wall tile. This proportion of cement and sand provided a more economical mortar that still had the advantage of being thin-setting.

Example 15

The mixture:

33.06% Portland cement
66.06% sand
0.88% 400 centipoise methyl cellulose was mixed into 20.4% of its weight of water to give a mortar that could be applied as in the previous example. It was found, also, that a thin "skimcoat" of this mortar spread over a thicker (about ½ inch) ground coat of a conventional mortar (composed of 1 part Portland cement, 3 parts sand, and ⅓ part lime, plus water) gave a setting bed to which dry vitreous or nonvitreous tile could be adhered.

Another of the improved techniques of the present invention is to utilize the mortars containing methyl cellulose as above defined in setting tile by applying a thin "dope coat" to the back of the tile and then setting the thus prepared tile on a conventional ground coat. This is illustrated in the following example.

Example 16

The mixture:

98.8% Portland cement
1.2% 4,000 centipoise methyl cellulose was mixed into 35% of its weight of water. This mortar was applied in a thin layer, 1/32 inch to 1/16 inch thick, to the backs of non-vitreous tile as a "dope coat." The tiles were then set on a conventional ground coat having the composition given in Example 20.

All of the above examples are illustrative of the range of the principal ingredients that can be used to make satisfactory mortars within the scope of the present invention. The powdered limestone can be used in amounts up to about 45% with particular advantages found in the range from about 10% to about 45%. The sand can be used in amounts up to about 75% with particular advantages found using from about 10% to about 75%. The amount of water required depends somewhat on the relative proportions of the solid ingredients used, on the use to which the mortar is to be put, and on whether limestone or sand is included in the mix. When limestone is used, the proportion of water is usually varied from about 27% to about 40%, the optimum in most cases being about 33%. When sand is used, the percentage of water may vary from about 20% to about 40%, the optimum being usually around 24% when the larger proportions of sand are used. However, for some uses, as little as 11% water can be used.

The methyl cellulose usable in the mortar compositions of the invention may vary in viscosity from about 10 to about 7,000 centipoises, measured in 2% aqueous solution and the amount may be varied from about 0.20% to about 6.5%. In general, the highest viscosity grades may be used in the smallest percentage amounts and the lowest viscosity grades may be used in the largest amounts within the range specified.

Certain other ingredients may be used in the mortars for particular purposes, these being generally used in minor amounts. For example, up to a few percent glycerine may be incorporated to plasticize the methyl cellulose and to retard the rate of setting, thus providing mortars having somewhat longer and better workability. The following are examples of mortar compositions including glycerine:

Example 17

79.72% Portland cement
18.00% powdered limestone
0.78% methyl cellulose (400 centipoise grade)
1.50% glycerine on powdered perlite (glycerine to perlite weight ratio being 0.5)

The above composition when mixed with 33% of its weight of water gave similar performance to the compositions of the previous examples. The perlite carrier is used so that the glycerine may be incorporated in powdered form to obtain better and more convenient mixing with the other ingredients.

Example 18

The composition:

98.30% Portland cement
1.35% 4,000 centipoise methyl cellulose
0.35% glycerine on perlite carrier (glycerine to perlite weight ratio being 0.5)

mixed into 34% of its weight of water, gave a thin-setting mortar of better workability characteristics and extended working time.

In utilizing improved mortar compositions in accordance with the present invention, it is desirable to be able to make up the proper mixes "on the job," particularly where the mortars are being used for large scale installations. However, it has been found that it is not practical to use the usual mixing equipment commonly employed by masons and contractors in trying to get a satisfactory blend of Portland cement, sand or powdered limestone, and methyl cellulose since the methyl cellulose cannot be distributed throughout the mix with sufficient uniformity for good results. In fact, it is not even possible to get a satisfactory blend of just the cement and the methyl cellulose with ordinary mixing equipment in a brief time.

Another feature of the present invention is the provision of techniques which solve the above problem. A methyl cellulose-limestone or a methyl cellulose-Portland cement concentrate can be pre-blended with "factory" mixing equipment and a portion of this concentrate can easily be satisfactorily blended with the proper amount of Portland cement required to make up the desired mortar on the job site. Ordinary mixing equipment can be used to make the latter blending operation. The following examples are illustrative of the technique.

Example 19

The following concentrate mix:

96.3% powdered limestone
3.7% 400 centipoise methyl cellulose was thoroughly mixed so as to uniformly distribute the methyl cellulose powder. This concentrate was later mixed with Portland cement at the job site with ordinary mixing equipment in the ratio of 2.5 parts by weight of the concentrate to 9.4 parts by weight of the Portland cement. The complete mixture was then mixed into 30% of its weight of water and provided a mortar capable of thin-setting ceramic tile.

Example 20

The concentrate mix:

96.3% Portland cement
3.7% 400 centipoise methyl cellulose was thoroughly mixed as in the preceding example and this concentrate was then utilized on the job site by blending it with additional Portland cement to bring the percentage of methyl cellulose in the final composition to the desired figure.

There have thus been described improved Portland cement mortars for setting vitreous or non-vitreous ceramic tile, laying masonry blocks, and many other applications. These mortars have the advantages of being both thin-setting and dry-setting and of being usable over such substrates as gypsum wall board, all of which properties are not found with ordinary cement mortars. Compared with Portland cement-methyl cellulose compositions previously used as paints, the present compositions utilize much less water and higher viscosity methyl cellulose than the optimum viscosity grades used in paints. In the compositions including sand or limestone, these ingredients are used in higher amounts than in cement based paints.

There have also been described a number of improved techniques for using these improved mortars, such techniques not being possible with conventional mortars.

Having thus described the invention what is claimed is:

1. A dry mortar composition adapted to be mixed with about 11 to 40% of its weight of water, which consists essentially of, by weight, 24.8 to 89.8% Portland cement, 0.2 to 6.5% methyl cellulose of 10 to 7000 centipoise viscosity grade and about 10 to 75% of at least one substance selected from the group consisting of sand and powdered limestone.

2. A dry mortar composition as set forth in claim 1, wherein the Portland cement is 49.8 to 79.8% and the substance selected from the group consisting of sand and powdered limestone is 20 to 50%.

3. A dry mortar composition as set forth in claim 1, wherein the Portland cement is present in an amount of 64.8 to 79.8% and the substance selected from the group consisting of sand and powdered limestone is present in an amount from 20 to 35%.

4. A dry mortar composition adapted to be mixed with about 11 to 40% of its weight of water, which consists essentially of, by weight, 39.8 to 89.9% Portland cement, 0.2 to 6.5% methyl cellulose of 10 to 7000 centipoises viscosity grade and 10 to 50% sand.

5. A dry mortar composition as set forth in claim 4, wherein the sand is present in an amount of 20 to 50%.

6. A dry mortar composition adapted to be mixed with about 11 to 40% of its weight of water, which consists essentially of, by weight, 49.8 to 89.8% Portland cement, 0.2 to 6.5% methyl cellulose of 10 to 7000 centipoises viscosity grade and about 10 to 50% powdered limestone.

7. A dry mortar composition as set forth in claim 6, wherein the powdered limestone is present in an amount of from 10 to 35%.

8. In the method of installing ceramic tile, which comprises covering a substrate with a bed of mortar and pressing the dry tile into said bed, the improvement which comprises utilizing a mortar consisting essentially of, by weight, 24.8 to 89.8% Portland cement, 0.2 to 6.5% methyl cellulose of 10 to 7000 centipoises viscosity grade and about 10 to 75% of at least one substance selected from the group consisting of sand and powdered limestone, said dry mortar having mixed with it 11 to 40% by weight of water.

9. A method according to claim 8, wherein the mortar bed is between about 1/16 and 1/4" thick.

10. A method according to claim 8, in which the back surfaces of the tile are given a thin coat of mortar prior to being set in the mortar bed.

References Cited in the file of this patent
UNITED STATES PATENTS

| | | |
|---|---|---|
| 2,432,971 | Ruthman et al. | Dec. 16, 1947 |
| 2,549,507 | Morgan et al. | Apr. 17, 1951 |
| 2,674,320 | Cutforth | Apr. 6, 1954 |
| 2,700,615 | Heijmer | Jan. 25, 1955 |
| 2,820,713 | Wagner | Jan. 21, 1958 |
| 2,838,411 | Wagner | June 10, 1958 |

UNITED STATES PATENT OFFICE

CERTIFICATE OF CORRECTION

Patent No. 2,934,932　　　　　　　　　　　　　　May 3, 1960

Herman B. Wagner

It is hereby certified that error appears in the printed specification of the above numbered patent requiring correction and that the said Letters Patent should read as corrected below.

Column 5, line 43, for "Example 20" read -- Example 15 --.

Signed and sealed this 13th day of December 1960.

(SEAL)
Attest:

KARL H. AXLINE
Attesting Officer

ROBERT C. WATSON
Commissioner of Patents